(12) United States Patent
Lorrillere et al.

(10) Patent No.: US 12,113,708 B2
(45) Date of Patent: Oct. 8, 2024

(54) PROVISIONING MEMORY RESOURCES ON FLEXIBLE HARDWARE PLATFORMS

(71) Applicant: Arista Networks, Inc., Santa Clara, CA (US)

(72) Inventors: Maxime Daniel Lorrillere, North Vancouver (CA); Suhas Raghunath Joshi, San Jose, CA (US)

(73) Assignee: Arista Networks, Inc., Santa Clara, CA (US)

(*) Notice: Subject to any disclaimer, the term of this patent is extended or adjusted under 35 U.S.C. 154(b) by 70 days.

(21) Appl. No.: 17/704,103

(22) Filed: Mar. 25, 2022

(65) Prior Publication Data

US 2023/0308390 A1  Sep. 28, 2023

(51) Int. Cl.
*H04L 45/00* (2022.01)
*H04L 45/42* (2022.01)
*H04L 47/762* (2022.01)
*H04L 47/78* (2022.01)

(52) U.S. Cl.
CPC .............. *H04L 45/66* (2013.01); *H04L 45/42* (2013.01); *H04L 47/762* (2013.01); *H04L 47/781* (2013.01)

(58) Field of Classification Search
CPC ..... H04L 45/42; H04L 47/762; H04L 47/781; H04L 45/66
USPC .......................................... 709/220–226, 238
See application file for complete search history.

(56) References Cited

U.S. PATENT DOCUMENTS

| | | | | |
|---|---|---|---|---|
| 6,334,175 | B1* | 12/2001 | Chih | G06F 12/06 711/170 |
| 8,639,487 | B1* | 1/2014 | Ezer | G06F 30/327 716/102 |
| 10,977,111 | B2* | 4/2021 | Rungta | G06F 9/451 |
| 2017/0331679 | A1* | 11/2017 | Whittaker | H04L 41/08 |
| 2021/0329004 | A1* | 10/2021 | Xing | H04L 63/0272 |
| 2023/0021472 | A1* | 1/2023 | Bulanova | G06F 8/4434 |
| 2023/0244619 | A1* | 8/2023 | Hillel | G06F 9/5016 711/170 |

* cited by examiner

*Primary Examiner* — Bryan Y Lee
(74) *Attorney, Agent, or Firm* — Tianyi He

(57) ABSTRACT

A method of allocating programmable memory in a network device includes receiving a set of desired features for the network device, and determining a plurality of constraints associated with the set of desired features. The plurality of constraints are converted into a plurality of Boolean representations of the constraints, and a feasibility is evaluated for the desired features based on the plurality of constraints.

19 Claims, 6 Drawing Sheets

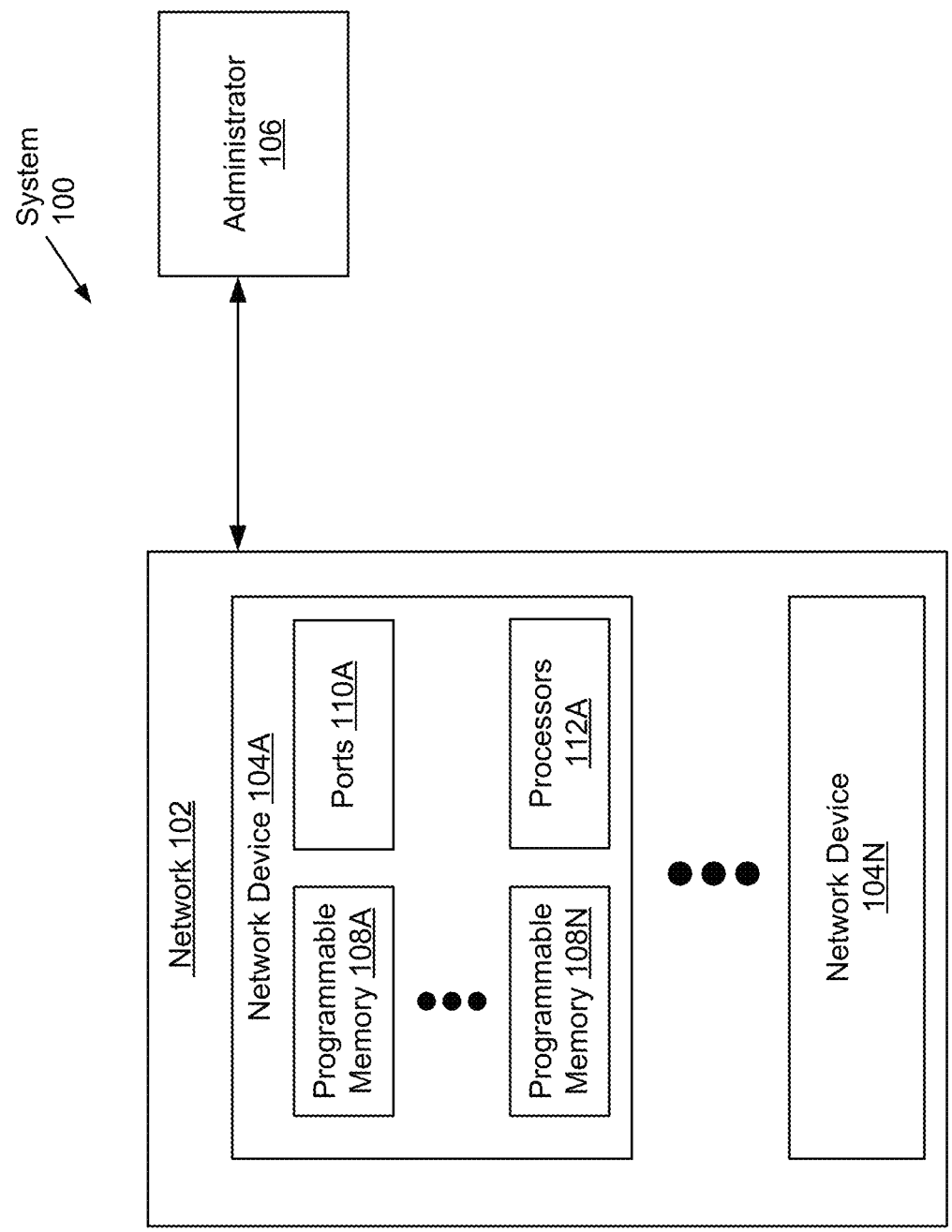

FIG. 3

PROVISIONING MEMORY RESOURCES ON FLEXIBLE HARDWARE PLATFORMS

BACKGROUND

Information technology (IT) networks may include numerous interconnected computing devices, routers, switches and/or other network elements. Modern switching Application Specific Integrated Circuits (ASICs) used in such networks have configurable memory blocks that can be allocated for use in network devices. Such memory blocks may be allocated to various tables to enable the features of the network device.

BRIEF DESCRIPTION OF DRAWINGS

Certain embodiments of the disclosure will be described with reference to the accompanying drawings. However, the accompanying drawings illustrate only certain aspects or implementations of the disclosure by way of example and are not meant to limit the scope of the claims.

FIG. 1 shows a system in accordance with one or more embodiments disclosed herein.

FIG. 3 shows an example of a profile in accordance with one or more embodiments disclosed herein.

DETAILED DESCRIPTION

Figures 2A, 2B:
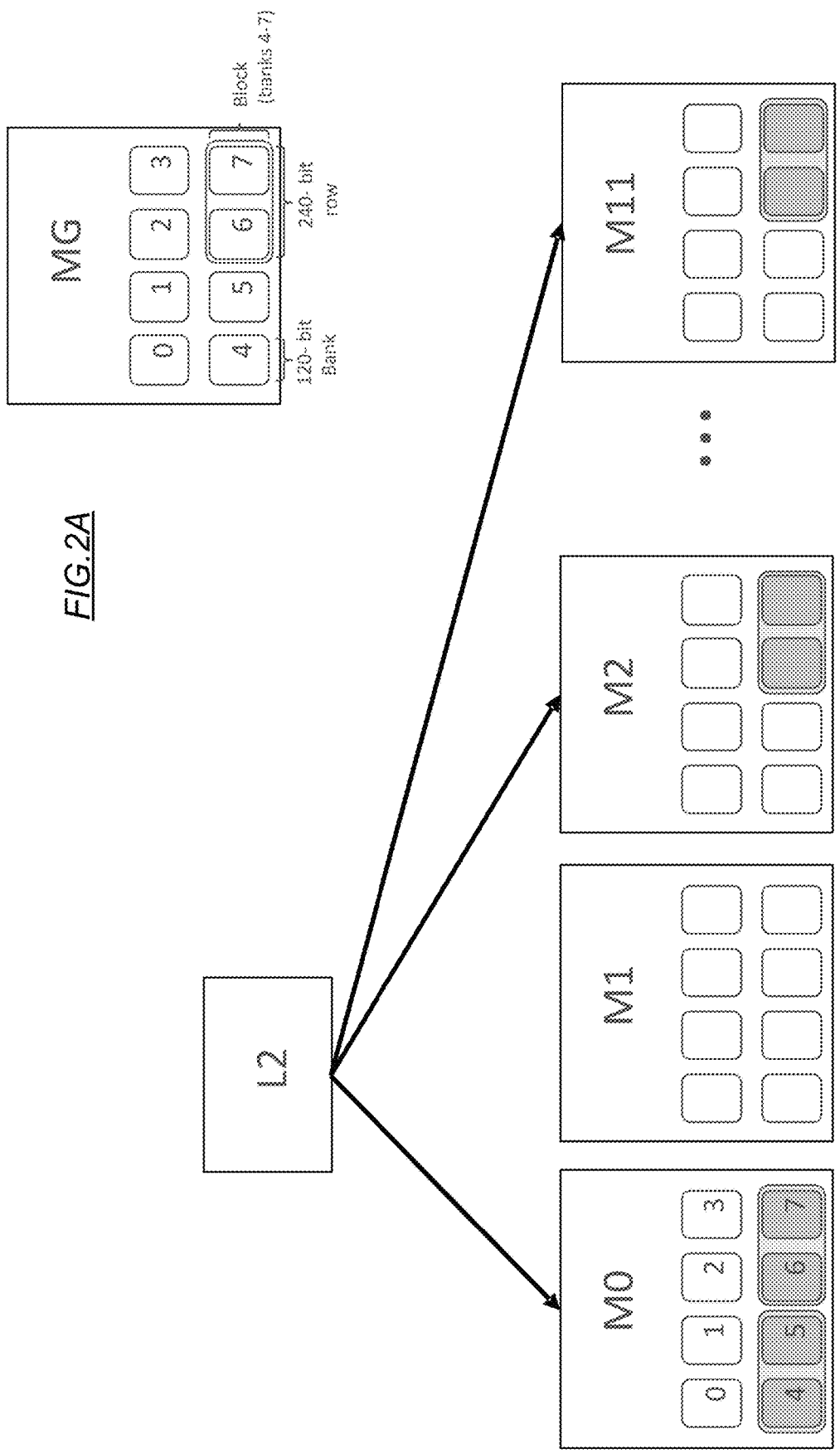
FIG. 2A demonstrates aspects of a programmable memory in accordance with one or more embodiments disclosed herein.
FIG. 2B demonstrates an allocation in accordance with one or more embodiments herein.

When allocating modern ASICs for use in network devices, the memory blocks may be allocated to various tables associated with specific features of the network device. For example, an Exact Match table and/or Router Database table may be used to establish an allocation of programmable memory in network devices. Each table may be associated with a number of constraints, such as the number of available physical connections to a subset of the memory blocks. Also, memory blocks may be potentially shared among different tables. As such, it may not be possible to maximize the scale of multiple features of a network device at the same time. Further, determining an appropriate allocation for the configurable memory blocks manually results in a time consuming process to account for all the constraints associated with all the desired features.

In general, embodiments disclosed herein provide a method and computer-readable medium to determine an allocation of the programmable memory of a network device for a set of desired features. More specifically, embodiments disclosed herein determine the constraints associated with desired features and the programmable memory, and embodiments evaluate those constraints to determine an allocation for that programmable memory. Embodiments disclosed herein determine if the allocation is feasible, and if the allocation is not feasible, embodiments may provide reasons for why the allocation is likely not possible on the programmed network device. If the allocation is feasible, a profile describing the appropriate allocation may be generated.

Specific embodiments will now be described with reference to the accompanying figures.

FIG. 1 shows a system in accordance with one or more embodiments disclosed herein. The system (100) includes a network (102) with a plurality of network devices (104A . . . 104N). The system (100) may also include an administrator device (106) for managing the system (100). Each network device (104A) includes multiple programmable memories (108A . . . 108N), one or more processors (112A), and ports (110A). Embodiments disclosed herein are not limited to the system configuration shown in FIG. 1, as embodiments are directed to establishing or adjusting the programmable memory (108A . . . 108N) of the network devices (104A . . . 104N).

In accordance with embodiments disclosed herein, the establishing or adjusting may be managed by the administrator (106). However, one of ordinary skill in the art will appreciate that embodiments are not limited as such. For example, the establishing or adjusting may be implemented by a network device (104A . . . 104N), or some supplemental device incorporated into the network for the purpose of embodiments disclosed herein.

In embodiments disclosed herein, the programmable memory (108A . . . 108N) includes programmable chips and/or chip sets with flexible memories that may be allocated/programmed. The desired functions and features of the specific network device have certain requirements that are used to program the programmable memory in accordance with embodiments disclosed herein. For example, switching Application Specific Integrated Circuits (ASICs) that have configurable memory blocks may be allocated to various tables to support the desired features. The various tables are then used to establish the operation/features of the network device. For example, a network device primarily used for Layer 2 (L2) switching may allocate more available memory to L2 MAC processes than a network device responsible for Layer 3 (L3) routing.

The programmable memory (108A . . . 108N) is constrained by the specific characteristics of the programmable chip set and the other hardware of the network device in accordance with embodiments disclosed herein. The specific characteristics include, for example, the number and type of available programmable memories in the programmable memory (e.g., 20), the number of banks per memory in the programmable memory (e.g., 4 or 8 120 bit banks), the size of the rows in the banks (e.g., 16 k or 8 k bits). Other hardware may include, for example, the number of connections available for the desired features.

FIG. 2A demonstrates aspects of a programmable memory in accordance with one or more embodiments disclosed herein. The memory group (MG) of FIG. 2A includes eight 120 bit banks (0 . . . 7). Embodiments disclosed herein are not limited to eight banks per memory group (MG), but may contain any number of banks. FIG. 2A demonstrates examples of how a memory group (MG) may be allocated: as an individual bank (0 . . . 7), a 240 bit row (6-7), or a block of four banks (4-7).

In view of FIG. 2A, the programmable memory (108A . . . 108N) may have multiple hardware constraints. For example, some memory banks may not be allocated together. The number of banks used per memory group can have multiple limitations. For example, as the width of a table varies, the number of memory banks that particular table needs is a function of table dimensions. Further, when allocating the programmable memory, some tables/features may require the allocation of contiguous banks.

Allocation of the programmable memory (108A . . . 108N) is also constrained by other factors associated with the desired features of the network device in accordance with embodiments disclosed herein. For example, when allocating the programmable memory (108A . . . 108N) for some features (e.g., L2 MAC features or L3 routes), scale constraints of the feature must be considered. For example, for a network device with memory used primarily for L2 switching, memory allocation scaling may be higher for L2 features.

Embodiments disclosed herein may consider the connectivity constraints required between the memories blocks and the tables. For example, tables may require one or more connections to the same memory bank, or require multiple connections. Other constraints may include the number of memory blocks required for a given table; the alignment of the allocated memory blocks; and/or the contiguity of the allocated memory blocks required for each specific feature.

FIG. 2B demonstrates a memory allocation in accordance with embodiments herein. In the example of FIG. 2B, the implementation of a feature such as a layer 2 MAC address database (L2) requires the allocation of four contiguous memory banks (shaded) in the memory group (M0), as well as a number of 240-bit row memory bank allocations (shaded) in the memory groups (M2) to (M11). In the example of FIG. 2B, the memory banks must be assigned in pairs, in accordance with a constraint associated with the feature. In accordance with the above, for example, the allocations of the memory groups (M2) to (M11) (shaded) may be associated with the scale requirements of the feature (L2). That is, the allocated memory of the memory groups (M2) to (M11) (shaded) is reserved for the scale requirements of the feature, and the allocated memory is not accessed until needed by the feature.

FIG. 2B illustrates a memory allocation associated with just one specific feature (L2). As such, the efficient allocation of memory in the programmable memory for an additional feature must not only account for the constraints associated with that additional feature, but also must not conflict with the previously allocated feature (L2). Each table that is associated with a feature has a limited number of physical connections to a subset of memory blocks. Such connections may be potentially shared with other tables. Therefore, it may not be possible to accommodate certain features at the same time.

Figure 3:
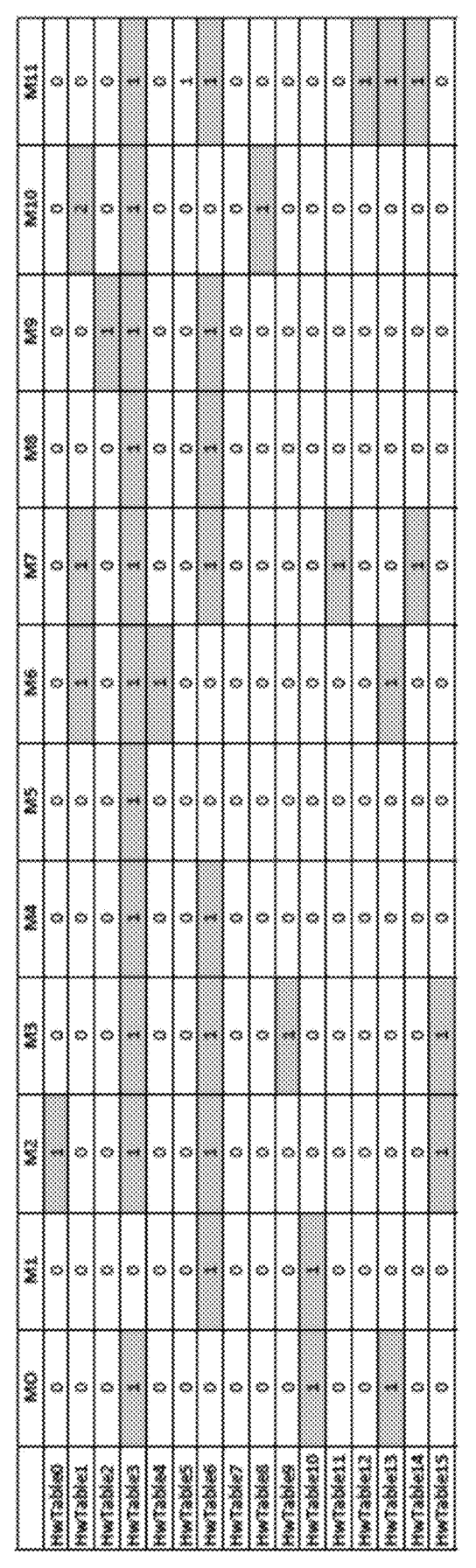

In accordance with embodiments disclosed herein, a memory profile identifies the allocation of a given programmable memory to support multiple features. FIG. 3 shows an example of a memory profile in accordance with one or more embodiments disclosed herein. As shown, each row of FIG. 3 represents a desired feature or table of the programmable memory (HwTable0 . . . HwTable15), while each column of FIG. 3 represents a memory group available in the programmable memory. In the example of FIG. 3, the memory group includes twelve groups of a first type (M0 . . . M11). For example, the first type may include groups with 16 k rows. There may be a second type of memory group that has a different number of rows as compared to the first type of memory. While the above description references two types of memory groups, disclosure may support any number of types of memory groups (all with different row sizes) without departing from the disclosure.

In FIG. 3, the shaded blocks indicate an allocation in the memory group corresponding to a specific feature or table, while the numbers shown in the blocks indicate a number of connections (wires) associated with the indicated memory group/feature. The memory profile can be used to establish the division of the available memory across various tables/features in accordance with embodiments disclosed herein. In the example of FIG. 3, sixteen features or tables are demonstrated, but one of ordinary skill in the art will appreciate that embodiments of the invention are not limited as such. For example, the number of features that can be supported is dependent on the amount of resources needed for each of the desired features. Although the example memory profile shown in FIG. 3 is shown in a table format, any data structure may be used that is capable of storing information as described herein without departing from the disclosure.

Embodiments disclosed herein take into consideration the hardware constraints associated with the programmable memory and the constraints associated with different tables associated with the desired features of the network device. With the identified constraints, a memory profile may be determined to support the desired features of the network device.

Figure 4:
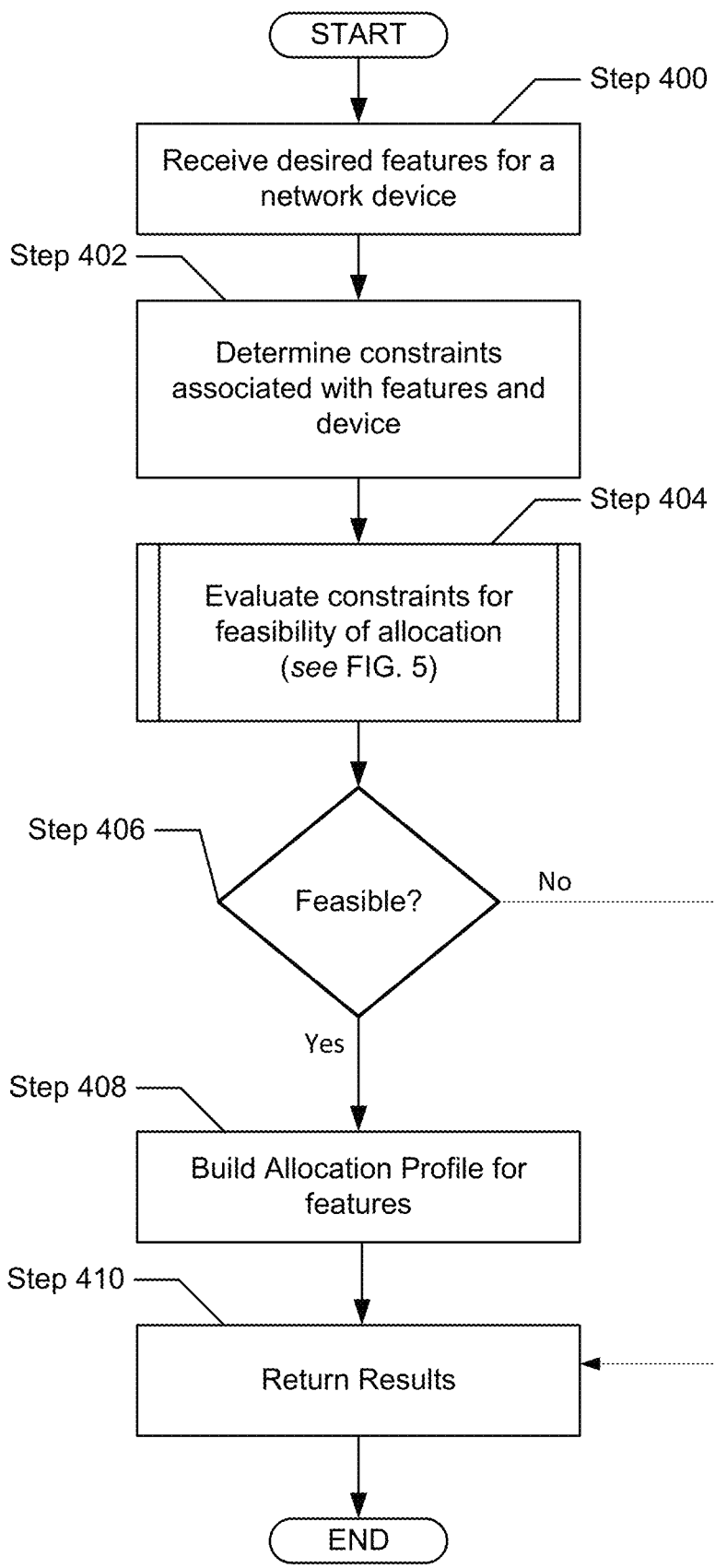
FIG. 4 shows a flow chart for determining a profile in accordance with one or more embodiments disclosed herein.

FIG. 4 shows a flow chart for determining a memory profile in accordance with one or more embodiments disclosed herein. Embodiments of FIG. 4 may be performed by an administrator, a network device, or a computing system as described in FIG. 6. In Step 400, the desired features for a network device are received. The desired features may be received from a potential user of the network device in accordance with embodiments disclosed herein. The desired features may also be received based on the role the network device plays in the network. For example, if the network device is to be used as an edge device, an internal switch, etc., one or more desired features associated with the role may be received. In some embodiments, the received desired features may be ranked in terms of priority.

In Step 402, the constraints associated with the desired features and the hardware of the network device are determined. As explained above with respect to FIGS. 2A-2B, a desired feature may be associated with one or more tables to be allocated in the programmable memory. In this step, the constraints associated with allocating memory for each of the desired features, as well as the constraints associated with the programmable memory are determined.

The constraints may be determined by accessing a database that stores constraints associated with the different desired features. The constraints associated with different hardware components may also be stored in a database or other accessible manner One of ordinary skill in the art will appreciate that the constraints may be stored locally in the device establishing the profile or in some other location accessible by the device establishing the profile.

After the constraints are determined, the constraints are evaluated for the feasibility of allocating memory for the desired features into the programmable memory of the network device in Step 404. Evaluation of the constraints is explained further below with respect to FIG. 5.

In Step 406, it is determined if the allocation of memory to support the desired features is feasible. That is, it is determined if it is possible to allocate memory for the received desired features in the programmable memory of the network device.

If the allocation of the desired features is feasible, a memory profile for the allocation may be built in Step 408 based on the evaluated constraints. In Step 410, the results of the memory profile are returned. The results may include an indication of whether the allocation is feasible. In this case, the results may also include a memory profile for the feasible allocation in accordance with one or more embodiments disclosed herein.

If the allocation of memory for the desired features is not feasible in Step 406, the process proceeds to Step 410, and returns an indication that the allocation is not feasible. In this case, embodiments may also return one or more reasons as to why the allocation is not feasible. Embodiments may issue a notification to a user that includes that the allocation is not feasible and/or one or more potential reasons for a conflict. For example, embodiments may return one or more conflicts in the allocation of memory for different features identified during the evaluation of the constraints in Step 404.

If the allocation of memory is determined to be feasible in Step 406, the programmable memory may be allocated according to the evaluated constraints in accordance with embodiments disclosed herein. In one embodiment, a process executing on the network device receives the memory profile and initiates the application of the memory profile within the network device, where the result of the application of the memory profile is programmable memory allocated in accordance with the memory profile. The programmable memory is then used by the network device to perform network operations (e.g., routing, switching, etc.) in accordance with embodiments disclosed herein.

Figure 5:
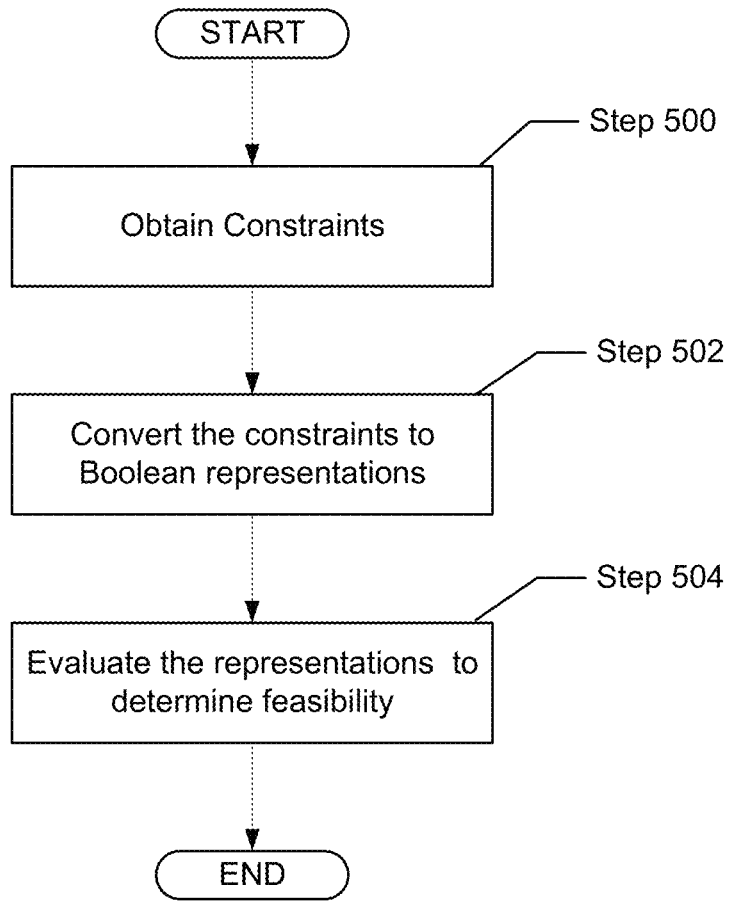
FIG. 5 shows a flow chart for evaluating constraints in accordance with one or more embodiments disclosed herein.

FIG. 5 shows a flow chart for evaluating constraints in accordance with one or more embodiments disclosed herein. Embodiments of FIG. 5 may be performed by an administrator (106), or a computing system as described in FIG. 6. In Step 500, the constraints associated with Step 402 of FIG. 4 are obtained. In Step 502, each constraint is converted to a Boolean representation of the constraint. For example, all the connections of a given table to each individual bank may be represented by a Boolean representation. Each Boolean representation may represent the state of an allocation of a bank to a particular table.

In Step 504, the Boolean representations are evaluated to determine the feasibility of the memory allocation given the obtained constraints. The representation may be evaluated by using the value assigned to each Boolean representation (i.e., allocated or not) that satisfies the obtained constraints. Further, individual banks may not be allocated to multiple tables. To prevent a bank from being allocated to multiple tables, for each bank a list of all the tables connected to the bank may be created. Then, the evaluation includes a limitation that no more than one table has an allocation to the bank.

As another example, for the allocation of 240 and 480 bit tables, the banks of the memory group must be allocated by pairs or fours. In this case, the evaluation may include iterating over the banks by pair, or fours, and forcing all the banks to be allocated together (or not). Such an iteration is achieved using combinations of OR, AND, or NOT Boolean operations.

As another example, for a constraint associated with a required minimum size, where the size is the number of allocated banks times the size of each bank, a Pseudo-Boolean inequality limitation may be used in the evaluation. That is, a Pseudo-Boolean inequality comparing the size of the allocated banks to the number of banks may be used to establish the size constraint.

The Boolean representations may be evaluated in Step 504 using a satisfiability modulo theories (SMT) solver in accordance with one or more embodiments disclosed herein. In such embodiments, the constraints may be modeled using SMT formulas. Then, an SMT solver may be used to determine if a solution exists that satisfies all the obtained constraints. More specifically, the solver may determine if there is an interpretation that satisfies the given Boolean formulas. If no solution exists, the SMT solver may provide which constraints cannot be satisfied at the same time.

In some embodiments, an established SMT solver may be used, such as Microsoft Research's "Z3 Theorem Prover." Such solvers may support Boolean values, integers, reals, bit vectors, arrays, and functions. Such solvers have been previously used to identify bugs in code, verify protocols, security testing, fuzz testing, and pre/post conditions testing.

One of ordinary skill in the art will appreciate that the SMT solver may be located external to the system and accessed remotely. For example, the SMT solver may be accessed remotely by an administrator or via a network device in the system.

Figure 6:
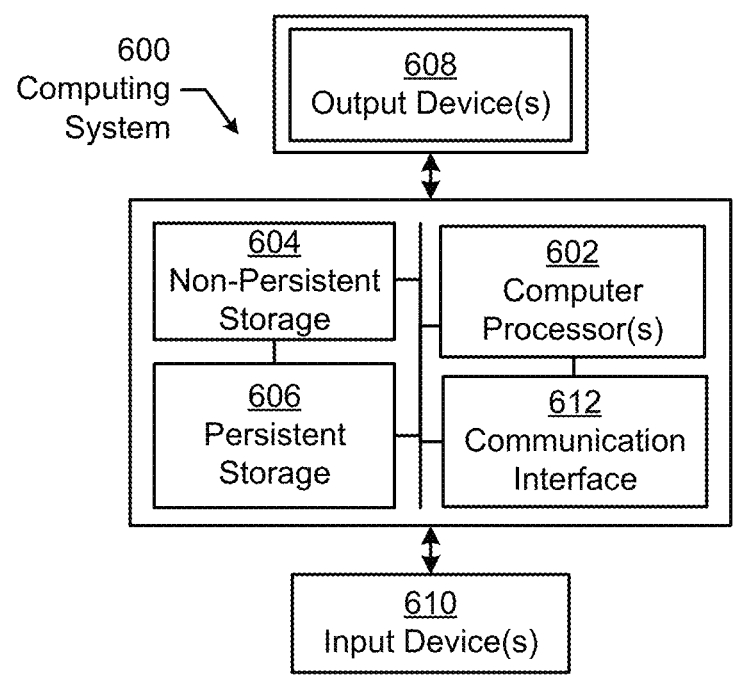
FIG. 6 shows a computing system in accordance with one or more embodiments disclosed herein.

FIG. 6 shows a computing system in accordance with one or more embodiments of the disclosure. The computing system (600) may be used as the administrator (106) shown in FIG. 1. The computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In embodiments disclosed herein, the computer processor(s) (602) may be an integrated circuit for processing instructions. For example, the computer processor(s) may be one or more cores or micro-cores of a central processing unit (CPU) and/or a graphics processing unit (GPU). The computing system (600) may also include one or more input devices (610), such as a touchscreen, keyboard, mouse, microphone, touchpad, electronic pen, or any other type of input device. Further, the communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

In embodiments disclosed herein, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by processor(s), is configured to perform one or more embodiments of the disclosure. Embodiments of the software instructions may be written in various languages, for example, C, C++, Python, etc.

Embodiments disclosed herein advantageously provide the capability to establish the allocation of programmable memory for tailored features in a network device according to specific desired features associated with the role the device plays in the network. Embodiments may improve the performance of networks by establishing a custom memory profile for the allocation of memory for the features in each of the network devices.

The advantages discussed above and throughout the detailed description should be understood as being examples associated with one or more problems being solved by embodiments of the disclosure. However, one or more embodiments of the disclosure disclosed herein should not be limited to solving the same/similar problems. The disclosed embodiments are broadly applicable to address a range of problems beyond those discussed herein.

In the above description, numerous details are set forth as examples of embodiments described herein. It will be understood by those skilled in the art, that have the benefit of this Detailed Description, that one or more embodiments described herein may be practiced without these specific details and that numerous variations or modifications may be possible without departing from the scope of the embodiments described herein. Certain details known to those of ordinary skill in the art may be omitted to avoid obscuring the description.

In the above description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components.

Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method of allocating programmable memory in a network device the method comprising:
   receiving a set of desired features for the network device, wherein the set of desired features is supported by a set of tables to be stored across a plurality of memory banks of the programmable memory;
   determining a plurality of constraints associated with the set of desired features and the programmable memory;
   converting the plurality of constraints into a plurality of Boolean representations of the constraints wherein the plurality of Boolean representations of the constraints comprises Boolean representations each representing a state of memory allocation of one or more memory banks in the plurality of memory banks to a corresponding table in the set of tables;
   using a Satisfiability Modulo Theories (SMT) solver to generate a result by evaluating a feasibility of allocating the programmable memory for the desired features based on the Boolean representations of the constraints, wherein the result generated using the SMT solver indicates whether or not a solution exists for allocating the programmable memory for the desired features given the plurality of constraints; and
   returning the result.

2. The method of claim 1, wherein the result indicates that the solution exists for allocating the programmable memory for the desired features given the plurality of constraints, and wherein the result comprises a memory profile of an allocation of the programmable memory for the desired features.

3. The method of claim 1, further comprising:
   wherein the result indicates that no solution exists for allocating the programmable memory for the desired features given the plurality of constraints, wherein the result comprises a notification that indicates an allocation of the programmable memory is not feasible, and wherein the notification comprises at least one reason for the allocation not being feasible.

4. The method of claim 1, wherein the features comprise at least one of the following:
   Layer 2 switching and Layer 3 routing.

5. The method of claim 1, wherein the plurality of constraints comprises scale constraints, connectivity constraints, and hardware constraints.

6. The method of claim 5, wherein the hardware constraints comprise:
   a number of a first type of memory groups with a first row size; and
   a number of a second type of memory groups with a second row size.

7. The method of claim 1, wherein the programmable memory in the network device is an application-specific integrated circuit (ASIC) memory.

8. The method of claim 1, wherein the set of desired features for the network device is selected by a user.

9. A non-transitory computer readable medium comprising computer readable program code, which when executed by a computer processor enables the computer processor to perform a method, the method comprising:
   receiving a set of desired features for a network device, wherein the set of desired features comprises a Layer 2 switching feature or a Layer 3 routing feature and wherein the given Layer 2 switching feature is supported by at least a Layer 2 address database to be stored across multiple memory groups of programmable memory of the network device;
   determining a plurality of constraints associated with the set of desired features, wherein the plurality of constraints comprises a number of banks to be used in each of the multiple memory groups for the Layer 2 address database and wherein the plurality of constraints comprises a scale requirement associated with a memory allocation in some of the multiple memory groups that is reserved for a scaling of the Layer 2 address database; and evaluating a feasibility of allocating the programmable memory for the desired features based on the plurality of constraints at least in part by evaluating a feasibility of allocating portions of the multiple memory groups to the Layer 2 address database based on the number of banks to be used in each of the multiple memory groups and based on the scale requirement.

10. The non-transitory computer readable medium of claim 9, the method further comprising:

converting the plurality of constraints into a plurality of Boolean representations of the constraints; and wherein the evaluation of the feasibility of allocating the programmable memory is based on the plurality of representations of the constraints.

11. The non-transitory computer readable medium of claim 9, the method further comprising:

determining that the allocation of the programmable memory is feasible; and generating, in response to the determination that the allocation of the programmable memory is feasible, the allocation of the programmable memory for the desired features.

12. The non-transitory computer readable medium of claim 9, the method further comprising:

determining that the allocation of the programmable memory is not feasible; and generating, based on the determination that the allocation of the programmable memory is not feasible, at least one reason for the allocation of the programmable memory not being feasible based on the evaluation of the feasibility of allocating the programmable memory.

13. The non-transitory computer readable medium of claim 9, wherein the plurality of constraints comprises connectivity constraints and hardware constraints.

14. The non-transitory computer readable medium of claim 13, wherein the hardware constraints comprise:

a number of a first type of memory groups with a first row size; and a number of a second type of memory groups with a second row size.

15. The non-transitory computer readable medium of claim 9, wherein the evaluation of the feasibility of allocating the programmable memory is performed using a Satisfiability Modulo Theories (SMT) solver.

16. The non-transitory computer readable medium of claim 9, wherein the set of desired features for the network device is selected by a user.

17. A network device comprising:

a processor and a memory, wherein the processor and memory are configured to:

receive a set of desired features for the network device, wherein each feature in the set of desired features is supported by a data structure to be implemented on memory blocks of programmable memory;

determine a plurality of constraints associated with the set of desired features, wherein the plurality of constraints comprises connectivity constraints for the data structures supporting the set of desired features and wherein the connectivity constraints for the data structures each indicate one or more connections to at least a subset of the memory blocks of the programmable memory;

evaluate a feasibility of allocating the memory blocks of the programmable memory for the desired features based at least in part on the connectivity constraints; and issue a notification that allocating the memory blocks of the programmable memory for the desired features is infeasible, wherein the notification comprises a conflict in memory allocation between first and second features in the set of desired features that is identified by the feasibility evaluation.

18. The network device of claim 17, wherein the processor and memory are further configured to:

convert the plurality of constraints into a plurality of Boolean representations of the constraints; and wherein the evaluation of the feasibility is based on the plurality of representations of the constraints.

19. The network device of claim 17, wherein the plurality of constraints comprises first additional constraints indicating a number of memory blocks usable to implement each of the data structures and second additional constraints indicating contiguity of memory block allocation for each feature in the set of desired features and wherein the feasibility of allocating the memory blocks of the programmable memory for the desired features is evaluated based at least in part on the first and second additional constraints.

* * * * *